United States Patent [19]

Waineo

[11] 4,413,220

[45] Nov. 1, 1983

[54] BATTERY DISCHARGE RATE CONTROL CIRCUITRY

[75] Inventor: Keith R. Waineo, Farmington Hills, Mich.

[73] Assignee: GSE, Inc., Farmington Hills, Mich.

[21] Appl. No.: 368,560

[22] Filed: Apr. 15, 1982

[51] Int. Cl.³ .............................................. H02J 7/00
[52] U.S. Cl. ...................................... 320/15; 307/18; 307/23; 307/29; 307/43; 307/80
[58] Field of Search ...................... 307/11, 12, 18, 23, 307/29, 38, 43, 52, 64, 80, 81; 320/15–17

*Primary Examiner*—William M. Shoop
*Assistant Examiner*—Anita M. Ault
*Attorney, Agent, or Firm*—Krass, Young & Schivley

[57] ABSTRACT

Techniques are disclosed for supplying positive and negative voltages to electrical components in a system where power demand from the components needing voltage of one polarity is different from the power demand from components needing voltage of the other polarity. At least two batteries of substantially the same capacity are connected in series and used to supply the positive and negative voltages to the system components. In order to permit the batteries to be recharged simultaneously in series without damage to them the interconnection between the batteries and the loads are alternately reversed so that the batteries will discharge at substantially the same rate.

4 Claims, 1 Drawing Figure

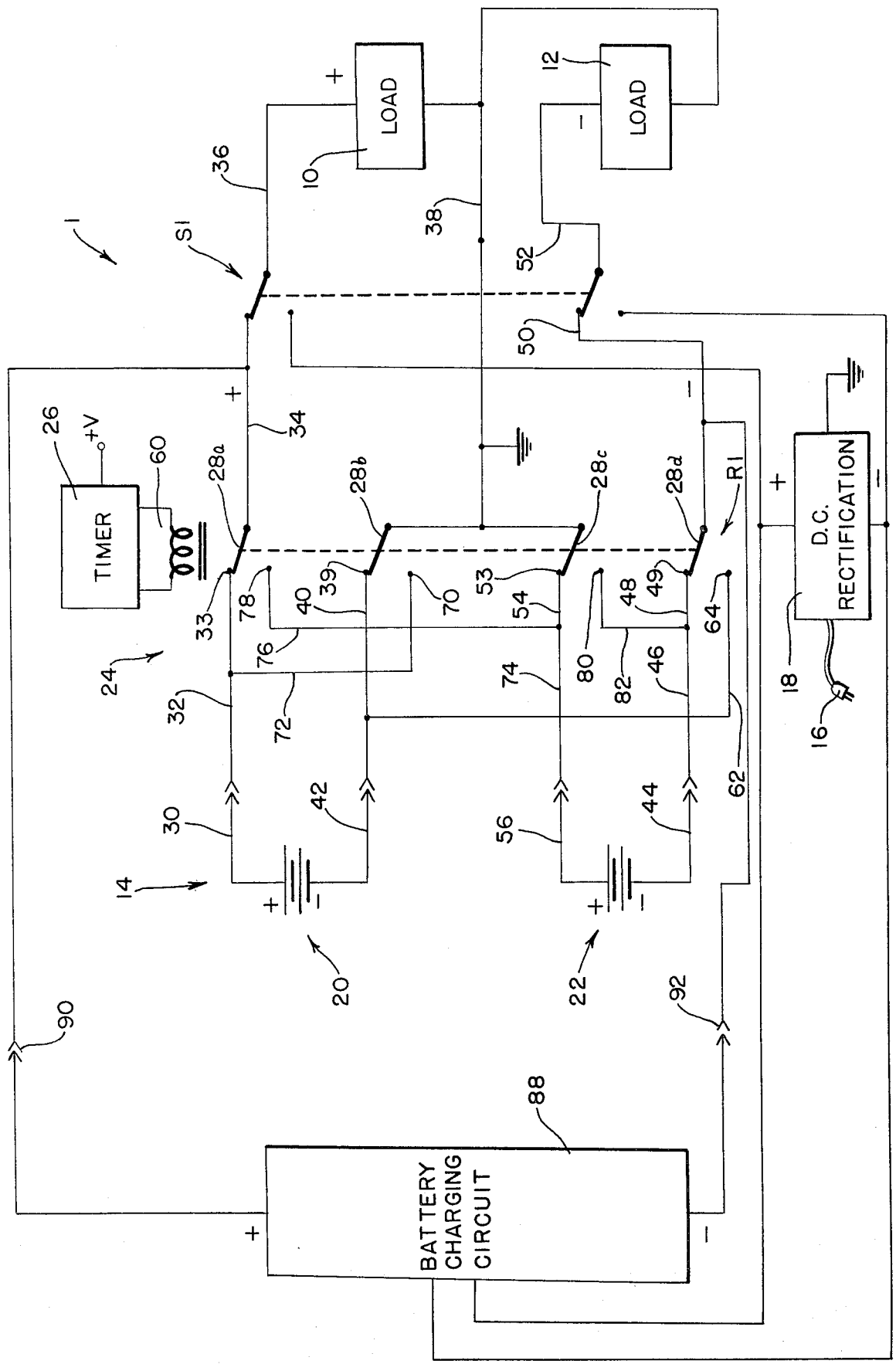

BATTERY DISCHARGE RATE CONTROL CIRCUITRY

DESCRIPTION

1. Technical Field

This invention relates to battery operated devices. More particularly, it involves circuitry for controlling the discharge rate of two or more batteries.

2. Background Art

Many electronic devices are designed to operate on battery power as well as normal A/C line power. Examples of such devices range from simple transistor radios to more complex microprocessor based instrumentation systems. At least in the more sophisticated systems some of the components require positive supply voltages whereas other components need negative supply voltages. For example, many microprocessors, light emitting diode (LED) displays, and associated display driver chips require positive voltages. On the other hand, instrumentation amplifiers or preamplifiers and Wheatstone bridge networks necessitate the use of negative supply voltages for their proper operation. Quite often the power demand from the components needing the voltage of one polarity is substantially greater than the power demand from components needing the voltage of the other polarity. In the above example there is a considerably greater current draw from the components needing the positive voltage in comparison with those requiring the negative voltage. In those instances it is, of course, possible to use a battery of a higher capacity or power rating to supply the positive voltage and a battery of a lesser capacity to supply the negative voltage. Unfortunately, such an implementation creates problems when it comes time to recharge the batteries. One plausible method of recharging the batteries is to physically remove them from the system and connect them into a recharging circuit. This, obviously, is a time consuming and bothersome chore.

It would be desirable to recharge the batteries automatically when using A/C line current to supply power to the system. Problems arise, however, in recharging the batteries if they are of different capacity and connected in series as is often the case in many system designs. Under such circumstances it is no possible, or at least not recommended, to simultaneously recharge both batteries in series from a common recharging circuit. This is because the amount of current necessary to properly recharge the battery of larger capacity may be too great for the smaller capacity battery to handle, thereby possibly causing the electrolyte to boil therein causing damage to the smaller capacity battery. Similar problems would occur if batteries of the same capacity are employed but one is discharged considerably more than the other battery as would be the case where one battery continuously supplies the positive voltage and the other battery the negative voltage to components having disproportionate power demands. Consequently, each battery should be charged one at a time or by two different charging circuits operating simultaneously on the two batteries. Both approaches require separate connections to the terminals of both batteries. The former approach is time consuming whereas the latter approach may further increase the system cost by requiring individually tailored charging circuits for each battery.

The present invention is directed to solving one or more of these problems.

SUMMARY OF THE INVENTION

According to the teachings of the present invention a technique is provided for supplying positive and negative voltages to electrical components in a system where power demand from the components needing voltage of one polarity is different from the power demand from components needing voltage of the other polarity. At least two batteries of subtantially the same capacity are connected in series. The batteries are suitably tapped such that for a given instance in time one battery provides power to those components needing a positive supply voltage whereas the second battery supplies current to those components requiring a negative supply voltage. Ordinarily, such an arrangement would result in one of the batteries discharging at a much faster rate than the other battery where the power demands of the two loads are disproportionate. However, switching means interconnected between the batteries and the loads is provided for alternately switching the connection of the batteries to the loads to discharge the batteries at substantially the same rate. In the preferred embodiment the switching means takes the form of a relay coupled between the terminals of the batteries and the loads which is activated by a timer to successively reverse the battery connections after a period of time. Since the batteries are connected in series and have thus been discharged at substantially the same rate they may be recharged simultaneously by a common recharging circuit without fear of damage to the batteries.

BRIEF DESCRIPTION OF THE DRAWINGS

The various advantages of the present invention will be fully appreciated by those skilled in the art by reading the following specification and by reference to the drawing in which:

FIG. 1 is a schematic diagram of a circuit for carrying out the teachings of the preferred embodiment of this invention.

DESCRIPTION OF THE PREFERRED EMBODIMENT

With reference to the drawing, system 1 employs a battery power supply to provide power to loads requiring different voltages for proper operation. Load 10 represents electrical components requiring a positive supply voltage whereas load 12 represents components requiring a negative supply voltage. In many systems there will be several components needing positive or negative supply voltages and in those cases they would be connected in parallel with loads 10 and 12, respectively. Additionally, D/C regulator circuits (not shown) for changing the battery voltage level to the level required by the individual components may also be employed in a typical application.

By way of a particular example, assume that the circuitry shown in FIG. 1 is used in a microprocessor based weigh scale having an LED display for displaying the weight of a load placed on a platform as sensed by a strain bridge network. The microprocessor, LED display, and associated display driver circuitry may require positive supply voltages whereas the strain gauge bridge and associated instrumentation amplifiers or preamplifiers require negative supply voltages. In such instances, the positive voltage loads 10 require much more power, i.e. draw larger currents than the negative loads 12. A wide variety of other electronic devices having similar disproportionate power demands will readily come to mind to a person skilled in the art.

In the preferred embodiment, the battery supply 14 may be an optional feature to the weigh scale or similar device which can also operate on conventional A/C line power. Plug 16 pictorially illustrates an input connection for plugging into a typical wall socket. D/C rectification circuitry 18 serves to convert the A/C voltage into direct current voltages.

Switch S1 is used to choose between A/C line power or power derived from battery supply 14. In the position shown switch S1 connects the battery supply 14 to the loads 10 and 12. The battery supply 14 may incorporate two or more series connected batteries 20 and 22. In this embodiment, the series connection between the batteries is provided by way of switching relay R1 to be described later herein. As known in the art batteries are generally made up of one or more cells which are connected together to provide a certain voltage output. A variety of different batteries may be employed. However, the batteries must be of substantially the same capacity or power rating. Battery capacities are generally rated according to the number of ampere/hours that the battery can deliver at a given voltage level. Batteries of the same capacity will have substantially the same operating characteristics and construction. In the preferred embodiment, batteries 20 and 22 are 12 volt gel-type batteries such as Model No. 1245-1 from Globe Battery Division or Model No. PS-1245 from Power Sonic Corporation. These gel-type batteries are generally lead-lead dioxide systems with a gelled electrolyte. They are preferable because they have better shelf life and can be recharged from a very low discharge condition.

Pursuant to the present invention a switching network 24 is connected beween the battery supply 14 and the loads 10 and 12. The switching network 24 in the preferred embodiment uses a four pole/double throw relay R1 which is controlled by a timer 26. The purpose of switching network 24 is to alternately switch the connection of the batteries to the loads to discharge the batteries at substantially the same rate. FIG. 1 illustrates contacts 28a-d of relay R1 in their normally closed position. An examination of the wiring interconnections between the batteries and the loads will reveal that battery 29 is connected across load 10 whereas battery 22 is connected across load 12 with the relay R1 in the illustrated nonactivated condition. Consequently, battery 20 will be supplying current to the more power demanding load 10 requiring a positive supply voltage whereas battery 22 will supply current to the less demanding load 12 requiring a negative supply voltage. Tracing the circuit between battery 20 and load 10: the positive terminal of battery 20 is connected to leads 30, 32 through pole 33 connected to contact 28a of relay R1, through switch S1 and lead 36 into the positive input of load 10 which, in turn, is connected to ground through lead 38. Contact 28b of relay R1 connected to pole 39 completes the circuit back to the negative terminal of battery 20 through leads 40 and 42. The negative terminal of battery 22 is connected to pole 49 of relay R1 through leads 44, 46 and 48. Contact 28d is connected to lead 50 which in turn is connected through switch S1 to the negative input of load 12 through lead 52. The load 12 is connected to ground through lead 38 and the circuit is completed through contact 28c making connection with the positive terminal of battery 22 through leads 54, 74 and 56.

In the preferred embodiment relay R1 is a multicontact relay made by Potter and Brumfield, Part No. R10-E1-Y4-V185. It is of a conventional solenoid type which is actuated by energization of coil 60. Coil 60, in turn, is energized by timer 26 in a repetitive on/off cycle. In the preferred embodiment timer 26 is a conventional multivibrator circuit which toggles as a function of an R/C time constant defined by a resistive-capacitive network (not shown). In the preferred embodiment, timer 26 serves to energize coil 60 for 22-23 minutes and then deenergize the coil for about the same period of time. This cycling process continues for as long as the battery supply 14 is providing power to the loads.

When coil 60 is energized contacts 28a-28d switch to their open position. An examination of the circuitry of FIG. 1 will reveal that battery 22 will now be connected across load 10 whereas battery 20 will be connected across load 12. In such manner battery 20 (which will have discharged more than battery 22) will now be connected across the less demanding negative supply components of load 12. Conversely, battery 22 which has not had as much current drain will now be supplying the more demanding positive voltage supply to the components of load 10. With relays R1 in the activated condition the circuit encompassing battery 20 and load 12 is as follows: the negative terminal of battery 20 is connected through leads 42 and 62 to pole 64. Contact 28d connects pole 64 to the negative input of load 12 through leads 50 and 52. The other side of load 12 is connected to ground through lead 38. The circuit is completed back to the positive terminal of battery 20 through contact 28b making connection with pole 70 and leads 72, 32 and 30. The circuit encompassing battery 22 and load 10 is as follows: the positive terminal of battery 22 is connected via leads 56, 74 and 76 to pole 78. Pole 78 is connected via contact 28a to the positive input of load 10 through lead 34, switch S1 and lead 36. The circuit is completed via lead 38 and contact 28c making connection with pole 80 which, in turn, is connected to the negative terminal of battery 22 through leads 82, 46 and 44.

One of the primary advantages of this so-called automatic "battery swapping" technique is that that batteries 20 and 22 may be recharged quickly and inexpensively. By periodically reversing the battery connections between the loads, the batteries will discharge at a substantially uniform rate. Consequently, they can be recharged simultaneously in series by a common battery charging circuit represented by the reference numeral 88. Battery charging circuit 88 may be of any suitable design. Since the batteries 20 and 22 are in series only two terminal connections (represented by reference numerals 90, 92) are required between charging circuit 88 and battery power supply 14. Charging circuit 88 serves to provide a reverse current through the batteries 20 and 22 at a voltage level between terminals 90 and 92 slightly greater than the combined nominal voltage ratings of the batteries, here 24 volts. Since batteries 20 and 22 will have been discharged to approximately the same level and are of the same capacity there is little chance of damaging one of the batteries from too much charging current.

While the battery charging circuit 88 can be a separate device which is plugged into terminals 90 and 92, the preferred embodiment employs circuit 88 as an integral part of the overall system design. When the weigh scale or other device is operating under A/C line power via plug 16, the switch S1 is thrown to the nonillustrated position. Rectification circuitry 18 thus supplies the necessary power to loads 10 and 12 as well as to battery charging circuit 88. Consequently, batteries 20 and 22 are recharged without removing them from the system and without disturbing the normal system operation. In other words, the batteries will be automatically recharged during normal use of the weigh scale or other device when powered by the A/C line voltage.

In this embodiment, timer 26 is powered by a positive voltage (+V) derived either from battery supply 14 or A/C power. Consequently, to account for the toggling action of relay R1, the battery charging circuit is connected to batteries 20 and 22 back through switching network 24 to insure that the correct polarity is alway connected to the batteries when charging. A study of the circuit diagram of FIG. 1 shows that batteries 20, 22 are always connected in series and that the positive and negative charging voltages are alway properly connected to the batteries regardless of the position of relay R1.

Those skilled in the art will come to appreciate the full range of advantages of the present invention and that modifications thereto can be made without departing from the spirit of the present invention. For example, it is envisioned that other suitable switching devices could be used in place of relay R1 and that the switching may be triggered on a basis other than time. For example, a more sophisticated approach would be to sense the instantaneous capacities of the batteries and cause switching thereof when one or more of them have been discharged below a given level. Still other modifications will become apparent after studying the specification, drawing and following claims.

I claim:

1. A circuit for supplying positive and negative voltages to electrical components in a system where power demand from the components needing voltage of one polarity is different than the power demand from components needing voltage of the other polarity, said circuit comprising:
   at least two batteries of substantially the same capacity connected in series;
   a first load having at least one component therein needing a positive supply voltage with a given power demand;
   a second load having at least one component therein needing a negative supply voltage with a different power demand; and
   switching means interconnected between the batteries and the loads for alternately switching connection of the batteries to the loads to discharge the batteries at substantially the same rate whereby said batteries may be conveniently recharged simultaneously in series from a common recharging circuit.

2. The circuit of claim 1 wherein said switching means comprises a relay which is switched as a function of time.

3. An electrical system comprising:
   a first load having at least one electrical component therein needing a positive supply voltage with a given power demand;
   a second load having at least one electrical component therein needing a negative supply voltage with a different power demand;
   an A/C power source;
   a rechargeable battery supply having at least two batteries of substantially the same capacity connected together in series;
   a battery charging circuit connected in parallel across said series connected batteries and being powered from said A/C power source; and
   switching means interconnected between the batteries and the loads for periodically switching the connection therebetween, operative in a first position to connect one battery across said first load and the other battery across said second load, and being further operative in a second position to reverse the connection such that said one battery is connected across said second load and said other battery is connected across said first load whereby said batteries are discharged at substantially the same rate when said loads are powered by said batteries and wherein said batteries are automatically recharged in series from said battery charging circuit when the loads are powered by said A/C power source.

4. The system of claim 3 wherein said switching means comprises a relay which is switched as a function of time.

* * * * *